United States Patent
Sheehan

[15] 3,640,743
[45] Feb. 8, 1972

[54] TITANIUM DIOXIDE PIGMENT

[72] Inventor: Gerard Martin Sheehan, Lynchburg, Va.

[73] Assignee: American Cyanamid Company, Stamford, Conn.

[22] Filed: July 30, 1970

[21] Appl. No.: 59,672

Related U.S. Application Data

[63] Continuation-in-part of Ser. No. 636,628, May 8, 1967, Pat. No. 3,528,837.

[52] U.S. Cl. ............................................106/300, 106/308 B
[51] Int. Cl. ..............................................................C09c 1/36
[58] Field of Search ...........................................106/300, 308 B

[56] References Cited

UNITED STATES PATENTS

| 3,418,147 | 12/1968 | Fields | 106/300 |
| 3,497,373 | 2/1970 | Rieck et al. | 106/300 |
| 3,503,772 | 3/1970 | Fields | 106/300 |

Primary Examiner—James E. Poer
Attorney—Roland A. Dexter

[57] ABSTRACT

This invention relates to titanium dioxide pigment of improved photochemical resistance which contain alumina and has a surface coating of a mixture of hydrous oxides of aluminum, silicon and zinc. The resulting pigment possesses improved resistance to discoloration and chalking upon exposure to ultraviolet light and is particularly useful as a pigmenting material for coating compositions and for opacifying resinous materials including laminates which are conventionally used in wall coverings, counter tops and cabinet facings.

3 Claims, No Drawings

TITANIUM DIOXIDE PIGMENT

This is a continuation-in-part of my copending application Ser. No. 636,628, filed May 8, 1967, now U.S. Pat. No. 3,528,837.

This invention relates to new and improved titanium dioxide pigments. It relates further to titanium dioxide pigment with improved photochemical resistance, whereby the pigment possesses improved resistance to chalking and fading. It relates further to coformed $TiO_2$-$Al_2O_3$ pigments of the rutile crystal modification having a coating in the form of a mixture of hydrous oxides of aluminum, silicon and zinc. The resulting pigment possesses improved resistance to discoloration and chalking upon exposure to ultraviolet light and is particularly useful as a pigmenting material for coating compositions and for opacifying resinous materials including laminates which are conventionally used in wall coverings, counter tops and cabinet facings.

Titanium dioxide pigments have found wide application in the coloring and opacification of resins and, in particular, melamine-formaldehyde, urea-formaldehyde, and phenol-formaldehyde resin. Such resins are used in preparation of molded articles and more widely used in the preparation of laminates wherein the resin acts as an adhesive to bind together layers of materials in such as wood and paper. The laminates which are prepared in this form are highly durable materials with good structural strength and are commonly found in counter tops, shelving and wall covering products. These products are typically colored with pigmentary materials which are compatible with both the resin and the laminar components. Titanium dioxide pigment which is typically used for opacifying such resinous compositions possesses excellent opacifying properties but is prone to discoloration and degradation upon exposure to ultraviolet light.

Efforts have been made to provide titanium dioxide pigments which could be used in resinous compositions for the above-noted purposes to provide the desired opacification while remaining resistant to discoloration and degradation after exposure to weather. One representative prior art method for providing titanium dioxide with the desired stability involved coating the crude titanium dioxide pigment with hydrous oxides of aluminum and silicon and recalcining the hydrous-oxide-coated material. This method, while yielding a pigment which has improved light stability, is not a completely adequate solution to the problem since it requires the application of a second calcining step to "fix" the hydrous oxide coating onto the $TiO_2$ pigment in order to obtain any degree of improved light fastness. Moreover, for the calcination to be effective, it must be conducted at a temperature of over about 700° C. The requirement for the extra calcination step is undesirable from the standpoint of production costs and, even more importantly, because high-temperature variation in the calcining apparatus results in the production of a pigmentary product of poor dispersibility and optical properties.

In view of the importance of titanium dioxide pigment and the widespread use thereof in applications requiring light-stable pigmentary materials, it is an object of the present invention to provide an improved pigmentary material which has excellent photochemical resistance and is thus usable for applications involving exposure to ultraviolet radiation. It is a further object of the present invention to provide $TiO_2$ pigment of improved photochemical resistance which can be used in resinous substrates such as those formed by formaldehyde condensation with melamine, urea, or phenol. In particular, it is an object of the present invention to provide a light stable $TiO_2$ pigment which is prepared by treating a crude $TiO_2$ pigment obtained by cocalcining or cocombusting a titaniferous material with an aluminum containing material, with a mixture of hydrous oxides of aluminum, silicon and zinc. Other objects will become apparent from a reading of the ensuing description of this invention.

The present invention provides light-stable $TiO_2$ pigment by using $TiO_2$ which is derived either from conventional hydrolysis or combustion processes. However, it is critical to the practice of the present invention that the crude $TiO_2$ pigment have associated therewith, either by formation in situ or subsequent addition prior to calcination or oxidation, a small amount of aluminum oxide, preferably about 0.1 to 4.0 percent based on the weight of the $TiO_2$ pigment.

Thus, one method of obtaining a crude $TiO_2$ pigment material for use in the present invention is by the digestion of titaniferous material such as ilmenite with a strong mineral acid such as sulfuric acid, whereby there is obtained a soluble titanium salt. As is well known, the titanium salt is converted to a titanium dioxide composition by controlled hydrolysis, and the resultant hydrolysates are filtered, washed and calcined. Calcination yields a material which can serve in many conventional pigmentary applications.

For the purpose of the present invention, as stated above, it is necessary that the crystalline rutile $TiO_2$ be coformed with a small amount of aluminum oxide rutile. The aluminum oxide can be added as an aluminum salt or hydrous aluminum oxide to the filtered and washed hydrolysate prior to the calcination step.

Likewise, the $TiO_2$ pigment which is useful as a starting material in the present invention can be obtained by combustion of titaniferous salts such as titanium tetrachloride. Such combustion methods for obtaining $TiO_2$ pigments are well known and the choice of any particular technique is not an essential part of the present invention. It is a matter of choice whether the aluminum oxide is incorporated into the $TiO_2$ starting material by formation in situ or by addition during the combustion of a titanium compound. It is most convenient to add an aluminum-containing material to obtain formation in situ, for example, an aluminum salt such as aluminum chloride is mixed with the titanium tetrachloride and burned concurrently to coform a $TiO_2$-$Al_2O_3$ crude pigment.

Regardless of the means by which the titania-alumina crude pigment is obtained, it can be converted by the process of the present invention to a pigmentary material of improved photochemical resistance. It is noteworthy, however, that the substitution of other oxides such as magnesium oxide for alumina does not yield a pigment of improved photochemical resistance such as can be obtained by the practice of the present invention. This is not to say, however, that auxiliary materials cannot be present in the starting material. Thus, it is feasible to have present in the starting material, additives such as carbonates and oxides of phosphorus which, to a large extent, provide desirable properties with respect to color brightness and tinting strength. However, it is to be understood that the present invention can be practiced without the addition of these auxiliary materials.

The admixture of the hydrous oxide coating onto the $TiO_2$ pigment may be carried out by any one of several methods. All the hydrous oxides may be coated upon the $TiO_2$-$Al_2O_3$ pigment simultaneously or the coating may be accomplished by sequentially applying each oxide coating. A convenient way of practicing the present invention involves forming an aqueous solution of a soluble silicate, a soluble aluminum salt, and a soluble zinc salt, admixing the resulting solution with the $TiO_2$-$Al_2O_3$ pigment, and then neutralizing the resulting slurry to a pH in the range of about 6 to 9, whereby the soluble salts are converted to their respective hydrous oxides which are deposited as a coating on the $TiO_2$ particles. The neutralized slurry can be filtered and washed directly, or it may be aged prior to filtration and washing. After washing to remove soluble salts, the filter cake may be further treated, dried and then pulverized to give the finely divided pigment of the present invention. Various soluble aluminum, silicon and zinc salts may be used to deposit the hydrous oxide coating provided by the present invention. Conveniently, aluminum sulfate can be used to supply the aluminum content required by the treating solution of the present invention. Soluble silicates such as an alkali metal silicate, e.g., sodium silicate, may be used to supply the silica content and a soluble zinc salt such as zinc sulfate may be used to supply the zinc oxide content of the treating solution used in the present invention. The treating solution should contain sufficient solute to coat the $TiO_2$-$Al_2O_3$ with between about 2 and 10 percent, preferably 3–6 percent of aluminum salt measured as $Al_2O_3$, between about 0.5 to 10 percent, preferably 1 to 3 percent of the silicate measured as silicon dioxide, and between about 0.05 to 10 percent, preferably 0.1 to 0.5 percent of the zinc compound measured as zinc oxide, all of which are based upon the weight of the $TiO_2$-$Al_2O_3$ to be treated. The limits are derived as a consequence of experimentally determining the regions within which the advantages of the invention are obtained.

The coated $TiO_2$-$Al_2O_3$ pigment produced by the present invention will be found to have a high degree of light stability and, surprisingly, the light stability is imparted without the requirement that the coated pigment be recalcined at a high temperature. It should be noted that a recalcining treatment, i.e., partial to complete dehydration of the hydrous oxide coating, will effect some improvement in light stability of the pigment while causing slight deterioration of other pigmentary properties. Suitable recalcining temperatures are from 400° to 800° C. which results in up to about 90 percent dehydration. Nevertheless, a pigment can be obtained which has excellent light stability without a calcining posttreatment.

The present invention thus provides a $TiO_2$ pigment which has excellent light stability in the content of resinous coating compositions. Pigment can thus be advantageously incorporated into melamine-formaldehyde, phenol-formaldehyde and urea-formaldehyde resin compositions, or alternatively, it can be used with advantage in fiber compositions as an opacifying agent or for the purposes of delustering the fiber.

The following examples are presented to further illustrate the present invention:

EXAMPLE 1

Control

Washed titania hydrolysate, containing a small amount of rutile seed (2.5 percent as described in Example 2 of U.S. Pat. No. 2,494,492) was blended with 0.4 percent $K_2CO_3$, sufficient $H_3PO_4$ to give about 0.26 percent $P_2O_5$, and 0.02 percent MgO (as the sulfate), based on the $TiO_2$ equivalent of the hydrolysate, and then calcined at about 1,000° C. to a rutile content of at least 99.5 percent as determined by X-ray diffraction analysis. The subsequent calciner discharge was then pulverized in a hammer mill such as the micropulverizer and, after slurrying water to yield a 20 percent by weight slurry, deflocculated by adjusting the pH of the slurry to 9.0–10.0 with sodium hydroxide. The slurry was then settled for a sufficient time to separate particles coarser than about 4 microns and the fines were then flocculated with a suitable reagent such as $MgSO_4$. The slurry was then filtered and dried to 115° C. and disintegrated in a laboratory micropulverizer.

EXAMPLE 2

End-treated Control—No $Al_2O_3$ in $TiO_2$ Starting Material

This sample was processed in the same manner as Example 1 up to the flocculation of the fines. In this case, the fines were "blended" with 4.0 percent $Al_2O_3$ as $Al_2(SO_4)_3$, 2.0 percent $SiO_2$ as $Na_2SiO_3$ and 0.3 percent ZnO as $ZnSO_4$ on a $TiO_2$ basis. The slurry was then heated to 70° C. (although any temperature from 25° C. to the boil may be used) and adjusted to neutral pH (6.8–8.0) with ammonium hydroxide. The neutralized slurry was then filtered and washed. It may be mixed for any desired length of time prior to filtration and washing. After washing to substantially remove the soluble salts, the cake was dried at 110° C. and disintegrated in a laboratory micropulverizer.

EXAMPLE 3

No $Al_2O_3$ Pretreatment—With Calcining

The sample was processed in the same manner as Example 2 up through the drying step. After drying, the sample was passed through a 4-mesh Tyler screen to break up lumps and fluid-energy milled in a 2-inch reductionizer with superheated steam at 500° F. The milled sample was then given a heat treatment at 750° C. for the one-half hour and subsequently disintegrated in a laboratory micropulverizer.

EXAMPLE 4

Coformed $TiO_2$-$Al_2O_3$ Calcination—No End Treatment

Washed titania hydrolysate containing a small amount of rutile seed (2.5 percent) was blended with 0.4 percent $K_2CO_3$, sufficient $H_3PO_4$ to give 0.26 percent $P_2O_5$ and 0.30 percent $Al_2O_3$ as the sulfate based on the $TiO_2$ equivalent of the hydrolysate, and then calcined at about 1,000° C. to a rutile content of at least 99.5 percent as determined by X-ray diffraction analysis. The calciner discharge was then processed to completion as the Example 1.

EXAMPLE 5

Present Invention

Calcined $TiO_2$-$Al_2O_3$ as prepared in Example 4 was finished by "blending," etc., as in Example 2 after hydroclassification to eliminate particles coarser than 4 microns.

EXAMPLE 6

Present Invention and Calcining Step

Calcined $TiO_2$-$Al_2O_3$ prepared in Example 4 was treated with hydrous oxides as in Example 2 and the fluid-energy milled and heat treated as in Example 3.

EXAMPLE 7

Coformed $TiO_2$-$Al_2O_3$ By Oxidation—No End Treatment

Rutile $TiO_2$ coformed with $Al_2O_3$ through the combustion of $TiCl_4$ gas with oxygen in the presence of gaseous aluminum chloride in amount of 3.0 percent $Al_2O_3$ on the $TiO_2$ equivalent of the $TiCl_4$ was processed as described in Example 1 starting with slurrying in $H_2O$ at about a 20 percent by weight solid content.

EXAMPLE 8

Present Invention—Chloride Pigment

Rutile $TiO_2$-$Al_2O_3$ as described in Example was end treated with hydrous oxides and finished by "blending," etc., as in Example 2.

EXAMPLE 9

No Zinc Oxide in End Treatment

Rutile $TiO_2$-$Al_2O_3$ as described in Example 4 was end treated with 2.0 percent $Al_2O_3$, 1.0 percent $TiO_2$ and 1.0 percent $SiO_2$ as the hydrous oxides, neutralized, washed and dried as in Example 2, then fluid-energy milled, but not heat-treated as in Example 3.

Following is a tabulation of the various examples and the photochemical resistance of the pigments as determined in mandelic acid and glycerine. The description of the test procedure follows the table.

TABLE I

| Example | Description | Hydrous oxide treatment | Milling | Post end treatment calcination | Reflectance Initial | Reflectance Final | Percent drop |
|---|---|---|---|---|---|---|---|
| 1 | Calcined with 0.02% MgO and then hydro-classified. | None | Micro-pulverizing | None | 86.0 | 63.8 | 22.2 |
| 2 | do | 4.0% $Al_2O_3$<br>2.0% $SiO_2$<br>0.3% ZnO | Micro-pulverizing | None | 86.0 | 76.4 | 9.6 |
| 3 | do | 4.0% $Al_2O_3$<br>2.0% $SiO_2$<br>0.3% ZnO | Jet milled | ½ hour at 750° C | 85.3 | 84.3 | 1.0 |

TABLE I

| Example | Description | Hydrous oxide treatment | Milling | Post end treatment calcination | Reflectance Initial | Reflectance Final | Percent drop |
|---|---|---|---|---|---|---|---|
| 4 | Calcined with 0.30% Al₂O₃ and then hydro-classified. | None | Micro-pulverizing | None | 86.0 | 78.4 | 7.6 |
| 5 | do | 4.0% Al₂O₃<br>2.0% SiO₂<br>0.3% ZnO | Micro-pulverizing | None | 86.0 | 85.2 | 0.8 |
| 6 | do | 4.0% Al₂O₃<br>2.0% SiO₂<br>0.3% ZnO | Jet milled | ½ hour at 750° C | 85.9 | 85.4 | 0.5 |
| 7 | TiCl₄ combusted with O₂ in prescence of 3.0% Al₂O₃ as AlCl₃ hydro-classified. | None | Micro-pulverizing | None | 84.4 | 71.4 | 13.0 |
| 8 | do | 4.0% Al₂O₃<br>2.0% SiO₂<br>0.3% ZnO | Micro-pulverizing | None | 85.5 | 82.5 | 3.0 |
| 9 | Hydrolysate calcined with Al₂O₃ and then hydro-classified. | 2.0% Al₂O₃<br>1.0% TiO₂<br>1.0% SiO₂ | Jet milled | None | 87.0 | 81.4 | 5.6 |

TEST PROCEDURE

To 10 grams of test sample add 4.5 cc. of a 7 percent solution of mandelic acid in glycerine. Mix thoroughly to give a paste suitable for mulling, but in the event a very still paste is encountered, a few more drops of glycerine may be added without materially affecting the results. Mull the mixed paste. Transfer a portion of the paste to a clean glass slide, spread paste evenly over the surface and cover with a second slide. Wipe off excess paste and bind the slides together. Enough paste must be used to prevent transparency or pin holes in the finished slides.

Using a standard reflectometer, initial green reflectance readings of samples are taken. Place slides equidistance apart on a rotating disc so that each will receive the same amount of U.V. irradiation. Expose rutile pigments for 5 hours. Measure and record drop in reflectance.

The drop in reflectance is a measure of photochemical stability. Each test pigment should be compared against a known standard prepared in the same manner.

Reported values will be percent drop in reflectance at the end of the 5-hour exposure.

EXAMPLE 10

Melamine Resin Containing Pigment of the Present Invention

Samples prepared as described in Examples 2, 3, and 5 were evaluated for their light stability in a melamine formaldehyde resin by exposing the pigmented resin films in a U.V. Weather-o-Meter for 16 hours.

The following results were obtained:

TABLE II

| Sample | Description | TA-68 Cymel Resin Initial | Final | % Drop |
|---|---|---|---|---|
| Example 2 | Calcined with 0.02% MgO-treated with 4% Al₂O₃, 2.0% SiO₂ and 0.3% ZnO-micropulverized. | 90.7 | 68.2 | 22.5 |
| Example 3 | Same as (2) except fluid-energy milled and post-calcined at 750° C. for ½ hour. | 90.0 | 83.0 | 7.0 |
| Example 5 | Calcined with 0.3% Al₂O₃ and treated as in (2). | 91.0 | 80.5 | 10.5 |

It may be noted that while postcalcination of a pigment originally calcined without Al₂O₃ and then treated with 4.0 percent Al₂O₃, 2.0 percent and 0.3 percent ZnO, yielded a pigment with substantially improved photochemical stability, the pigment cocalcined with Al₂O₃ and treated in the same manner was almost equivalent in process reflectance stability without postcalcination.

I claim:

1. Pigment particles having cores of crystalline rutile titanium dioxide containing from 0.1 to 4.0 percent alumina, said cores having a coating thereon consisting of hydrous oxides of aluminum, silicon and zinc in amounts providing from 2 to 10 percent Al₂O₃, from 0.5 to 10 percent SiO₂ and from 0.05 to 10 percent ZnO, said percentages being by weight based on the TiO₂-Al₂O₃ core.

2. The pigment of claim 1 wherein the hydrous oxide of Al₂O₃ is present in from 3 to 6 percent, the hydrous oxide of SiO₂ is present in from 1 to 3 percent, and the hydrous oxide of ZnO is present in from 0.1 to 0.5 percent.

3. The pigment of claim 1 wherein the coating is up to about 90 percent dehydrated.

* * * * *

UNITED STATES PATENT OFFICE
CERTIFICATE OF CORRECTION

Patent No. 3,640,743         Dated February 8, 1972

Inventor(s)    Gerard Martin Sheehan

It is certified that error appears in the above-identified patent and that said Letters Patent are hereby corrected as shown below:

Column 1, line 41 after the word dioxide -- pigment -- should be added.

Column 3, line 11, "$TiO_2-AlO_3$" should read -- $TiO_2-Al_2O_3$ --

Column 4, line 50, "Example was" should read --Example 7 was --

Column 6, line 30, "2.0 percent and" should read -- 2.0 percent $SiO_2$ and --.

Signed and sealed this 20th day of June 1972.

(SEAL)
Attest:

EDWARD M. FLETCHER, JR.
Attesting Officer

ROBERT GOTTSCHALK
Commissioner of Patents